United States Patent
Nozawa et al.

(10) Patent No.: US 7,329,967 B2
(45) Date of Patent: Feb. 12, 2008

(54) ELECTRONIC CONTROL UNIT FOR CAR

(75) Inventors: Kazunori Nozawa, Chiyoda-ku (JP); Itaru Tanabe, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 597 days.

(21) Appl. No.: 10/729,907

(22) Filed: Dec. 9, 2003

(65) Prior Publication Data

US 2004/0124705 A1   Jul. 1, 2004

(30) Foreign Application Priority Data

Dec. 10, 2002  (JP) ............................. 2002-357690

(51) Int. Cl.
*H02H 7/18* (2006.01)
(52) U.S. Cl. .................................... 307/10.7
(58) Field of Classification Search ............... 307/10.6, 307/10.7

See application file for complete search history.

(56) References Cited

U.S. PATENT DOCUMENTS 4,493,001 A * 1/1985 Sheldrake .................... 361/92

FOREIGN PATENT DOCUMENTS

| JP | 59-176992 | 11/1984 |
|----|-----------|---------|
| JP | 62-156063 | 10/1987 |
| JP | 11-132086 | 5/1999 |
| JP | 2000-172384 | 6/2000 |

OTHER PUBLICATIONS

Corresponding Japanese Office Action dated Jun. 28, 2005, with English translation.

* cited by examiner

*Primary Examiner*—Michael Sherry
*Assistant Examiner*—Michael Rutland-Wallis
(74) *Attorney, Agent, or Firm*—Crowell & Moring LLP

(57) ABSTRACT

A control unit stops the supply of constant voltage into a vehicle electronic control unit in an abnormal state even though the ignition is off. A delay circuit for delaying an ignition OFF signal is installed outside the central processing unit. By controlling the power source to OFF by an output signal of the delay circuit or by the delay circuit for delaying by a longer time than that of a shut-off signal from the CPU due to the ignition OFF signal, and by the AND circuit of the output signal of the delay circuit and the shut-off signal from the CPU, and by an output signal of the AND circuit which is changed from high to low, the power supply from the power source IC is stopped.

2 Claims, 11 Drawing Sheets

ELECTRONIC CONTROL UNIT FOR CAR

BACKGROUND OF THE INVENTION

1. Field of the Invention

The present invention relates to an electronic control unit for car having the so-called self-shut OFF function for, when turning off an ignition switch (IGN SW) to supply or interrupt a constant voltage to a circuit in the electron control unit for car, detecting it by a central processing unit (CPU) and interrupting the supply of the constant voltage (VCC) to the internal circuit after a predetermined time using a control signal from the central processing unit (CPU).

2. Prior Art

Patent Document 1: Japanese Application Patent Laid-open Publication No. 2000-172384

Patent Document 2: Japanese Application Patent Laid-open Publication No. Hei 11-132086

Conventionally, a system is used for turning on an ignition switch (IGN SW), transforming a supply voltage (VIGN) from a battery to a constant voltage (VCC) by a power source IC via the ignition switch (IGN SW), and then supplying the constant voltage (VCC) to the internal circuit. Further, the system, using a function (a self-shut OFF function) for inversely turning off the ignition switch (IGN SW), detecting interruption of the supply of the supply voltage (VIGN) by the central processing unit (CPU), and interrupting the supply of the constant voltage (VCC) to the internal circuit after a predetermined time, outputs a control signal to the power source IC from the central processing unit (CPU), then puts the power source IC into the non-operation state, and interrupts the constant voltage (VCC) to be supplied to the internal circuit. By these operations, the constant voltage (VCC) is supplied to or interrupted from the electronic control unit for car.

The problems of the prior art will be explained by referring to FIGS. 14 and 15. FIG. 14 is a circuit block diagram thereof. When an ignition switch SW3 is turned on, a VIGN voltage 3a immediately transfers a signal 7a from the ignition switch SW3 to a power source IC 6 via a diode 7. By doing this, the power source IC 6 is switched to the operation state and starts supply of an inner constant voltage (VCC) 6a into an electronic control unit for car 1. Thereafter, when the ignition switch SW3 is turned off, the signal 7a for controlling the power source IC 6 is controlled by a control signal 9a from a CPU 9 instead of the VIGN voltage 3a due to the OR circuit constitution of the diode.

FIG. 15 is a timing diagram of the aforementioned block diagram, showing that when the VIGN voltage 3a is changed from an LO signal to an HI signal, the signal 7a controlling the power source IC 6 is also changed immediately to an HI signal. At this time, the power source IC 6 is switched to the operation state and starts supply of the inner constant voltage (VCC) 6a into the electronic control unit for car 1. Further, when the VIGN voltage 3a is changed from the HI signal to the HI LO signal, the CPU 9 detects it and the control signal 9a from the CPU 9 puts the power source IC 6 into the non-operation state after a lapse of a predetermined time of Delay 1 to interrupt the supply of the inner constant voltage (VCC) 6a. However, when the line of the control signal 9a from the CPU 9 is fixed to high due to an unexpected situation, even if the VIGN voltage 3a is changed from the HI signal to the LO signal, the signal 7a controlling the power source IC 6 is fixed to high, thereby cannot put the power source IC 6 into the standby state. Therefore, by a battery voltage 4a, the power source IC 6 cannot be put into the non-operation state. As a result, the inner constant voltage (VCC) 6a is always supplied into the electronic control unit for car 1. It is indicated by a dotted line (right half) shown in FIG. 15.

The Patent Document 1 mentioned above discloses an art of surely stopping a car computer according to the OFF operation of an accessory power source (ACC power source). The art has two timers and has a means for stopping the computer when the first waiting time elapses and the shut-down process is not performed. And, the art has a second timer, when the OFF operation is performed, for starting measurement of the second waiting time longer than the first waiting time. And, the art, when the second waiting time elapses, interrupts the power source of the computer. Therefore, the power source is interrupted only by the second timer.

Further, the Patent Document 2 discloses that when a plurality of controllers are connected with communication lines, on the basis of the key switch state, the controllers control power supply to the engine control unit and engine starting means.

SUMMARY OF THE INVENTION (Problems to be Solved by the Invention)

In the future, the environment where an electronic control unit for car is to be installed is apt to move into the engine room or transmission. However, for the electronic control unit for car, even in an environment under such an unfavorable condition, the same reliability and safety as those at present are required.

The aforementioned prior art has a function (a self-shut OFF function) for detecting interruption of the supply of the supply voltage (VIGN) by the central processing unit (CPU) when the ignition switch (IGN SW) is turned off and interrupting the supply of the constant voltage (VCC) to the inner circuit after a predetermined time. The central processing unit (CPU) outputs a control signal to the power source IC, thereby moves the power source IC into the non-operation state, and interrupts the constant voltage (VCC) to be supplied to the inner circuit.

However, when the control signal from the central processing unit (CPU) is continuously kept as an HI signal (for permitting the power source IC to operate) due to an unexpected situation, the power source IC cannot be moved into the non-operation state and the constant voltage (VCC) is always supplied into the electronic control unit for car. Therefore, in this case, the power is continuously supplied from the battery, so that the battery is consumed unavoidably.

An object of the present invention is to solve the aforementioned problems and to provide a control unit, even if the line of the control signal from the central processing unit (CPU) is fixed to an HI signal due to an unexpected situation, for moving the power source IC into the non-operation state, interrupting the supply of the constant voltage (VCC), preventing the battery from consumption, and ensuring reliability and safety.

(Means for Solving the Problems)

The electronic control unit for car of the present invention, even if the line of the control signal from the central processing unit (CPU) is continuously kept as an HI signal (for permitting the power source IC to operate) due to an unexpected situation, generates another control signal for interrupting the supply of the constant voltage from the power source IC, thus the aforementioned problems can be solved using the signal. A concrete solving means will be described below.

In the electronic control unit for car comprising a battery power source, an ignition switch, and a power source IC for supplying a constant voltage (VCC) to said electronic control unit including a central processing unit when said ignition switch is turned on and for interrupting said supply of said constant voltage when said ignition switch is turned off, by comprising a delay circuit for delaying said OFF signal by a predetermined time when said ignition switch is turned off, said supply of said constant voltage to said electronic control unit from said power source IC can be interrupted by an output signal of said delay circuit.

Further, by comprising a delay circuit for delaying said OFF signal by a predetermined time when said ignition switch is turned. off, and an AND circuit inputting an output signal of said delay circuit, and inputting a constant voltage (VCC) supply interruption signal generated by said central processing unit after a lapse of a predetermined time when said central processing unit detects interruption of said power supply from said battery, said supply of said constant voltage to said electronic control unit from said power source IC is interrupted by an output signal of said AND circuit.

Further, the delay time of the delay circuit is set at a delay time longer than the predetermined time required for stop initialization of the central processing unit. Further, the delay circuit is a delay circuit constituted by a resistor, a capacitor, and a diode and by selecting the constants thereof, the delay time is set. Further, the delay circuit can be constituted by a counter. Further, the central processing unit makes a self-diagnosis of detecting interruption of the power supply from the battery, inputting the constant voltage (VCC) supply interruption signal generated by itself after a lapse of the predetermined time required for stop initialization thereof to a digital input port or an analog input port thereof, and monitoring the state of supply or interruption of the constant voltage by itself.

Further, the central processing unit detects interruption of the power supply from the battery, and an AND circuit of the constant voltage (VCC) supply interruption signal generated by the central processing unit after a lapse of the predetermined time required for stop initialization thereof, of the output signal from the delay circuit, and of another port signal of the central processing unit is installed, and by an output signal of the AND circuit, the supply of the constant voltage is interrupted.

Further, in the electronic control unit for car comprising a battery power source, an ignition switch, and a power source IC for supplying a constant voltage (VCC) to said electronic control unit including a central processing unit when said ignition switch is turned on and for interrupting said supply of said constant voltage when said ignition switch is turned off, by comprising a delay circuit for delaying said OFF signal by a predetermined time when said ignition switch is turned off, a switching means installed for output of said delay circuit; and a switching means installed for a constant voltage (VCC) supply interruption signal generated by said central processing unit after a lapse of a predetermined time when said central processing unit detects interruption of said power supply from said battery, said supply of said constant voltage to said electronic control unit is interrupted by responding to the both output signals of said two switching means.

Further, for either of the constant voltage (VCC) supply interruption signal generated by the central processing unit and an output signal of the delay circuit for, when the ignition switch is turned off, delaying the OFF signal by a predetermined time, a switching means is installed. Further, only for outputting the constant voltage (VCC) supply interruption signal generated by the central processing unit after a lapse of the predetermined time required for stop initialization thereof, a transistor switching means is installed. Further, a switching means is installed for output of the power source IC and it controls turning on or off the constant voltage (VCC) supply by the output signal of the AND circuit.

DETAILED DESCRIPTION OF THE INVENTION

The embodiments of the present invention will be explained below with reference to the accompanying drawings.

Figure 1:
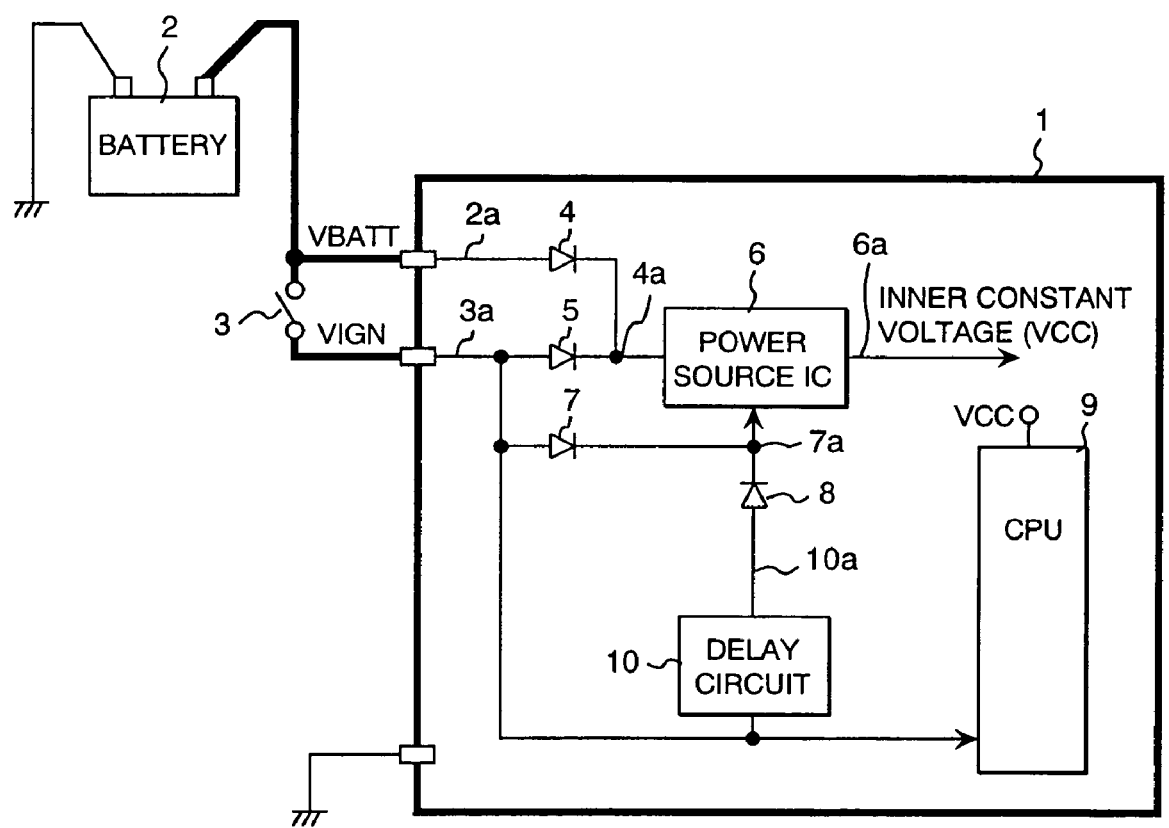
FIG. 1 is a drawing showing the constitution of the electronic control unit for car of the present invention.
Figure 2:
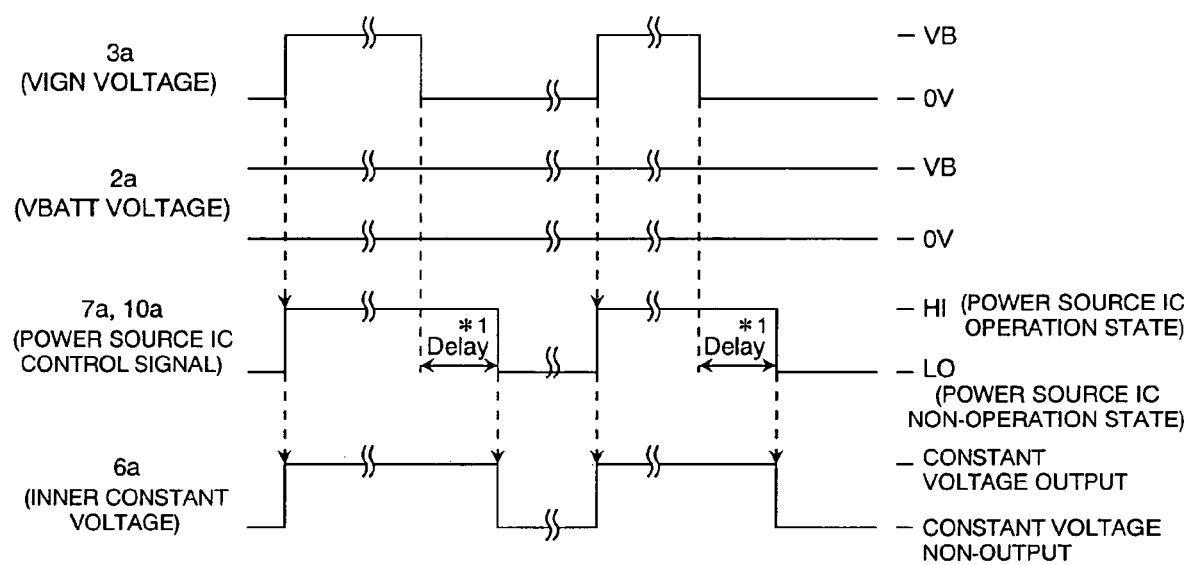
FIG. 2 is a drawing showing the operation timing of the electronic control unit for car of the present invention.

FIGS. 1 and 2 respectively show a system block diagram and a timing diagram of the electronic control unit for car of the present invention. Numeral 1 indicates an electronic control unit for car. The electronic control unit for car 1 supplies a battery voltage 2a from a battery 2 installed in a car to a power source IC 6 as a battery voltage 4a via an inverse connection preventive diode 4 in the electronic control unit for car 1. The battery voltage 4a is always applied to the electronic control unit for car 1.

Further, a VIGN voltage 3a supplied via an ignition switch SW3 is supplied to the power source IC 6 via an inverse connection preventive diode 5. The VIGN voltage 3a, only when the ignition switch SW3 is on, is applied to the electronic control unit for car 1. And, the VIGN voltage 3a is simultaneously used to be transferred to a CPU 9 which is a central processing unit as a state signal of the ignition switch SW3, so that the CPU 9 can recognize (detect) whether the ignition switch SW3 is on or off. A diode 7 transfers a signal from the ignition switch SW3 to the power source IC 6 and a signal 7a of the diode 7 on the output side is a signal for controlling the power source IC 6. When the control signal 7a is high, the power source IC 6 is in. the operation state and supplies the constant voltage VCC and when the control signal 7a is low, the power source IC 6 is in the non-operation state. Depending on the state of the control signal 7a, the inner constant voltage (VCC) 6a is controlled to supply to or interruption from the electronic control unit for car 1.

A delay circuit 10 is a delay circuit which, when the ignition switch SW3 is turned off, retains a predetermined time-HI signal, then changes it to an LO signal, and outputs a signal 10a. The signal 10a is supplied to the power source 16 via a diode 8, and when the signal 10a is low, it changes the signal 7a to low, thereby can change the power source IC 6 to the operation state or non-operation state. And, when the ignition switch SW3 is turned off, the signal 10a is changed from high to low, and then the signal 7a of the diode 8 on the output side after a lapse of the delay time is also changed from high to low, and the supply of the inner constant voltage 6a into the electronic control unit for car 1 is interrupted.

As shown in FIG. 2, the VIGN voltage 3a is already changed from high (VB) to low (0), so that the state of the signal 7a is decided by the output signal 10a of the delay circuit 10. Namely, after a lapse of a predetermined fixed delay time (*1, Delay), the signal 10a controlling the power source IC 6 is changed from high to low, so that the signal 7a is also changed from high (VB) to low (0). And, the supply of the inner constant voltage 6a into the electronic control unit for car 1 is interrupted. The Delay time is decided so as to ensure a time necessary for initialization at the time of interruption of the power source by the CPU 9 and to interrupt the VCC source after end of the initialization.

Figure 3:
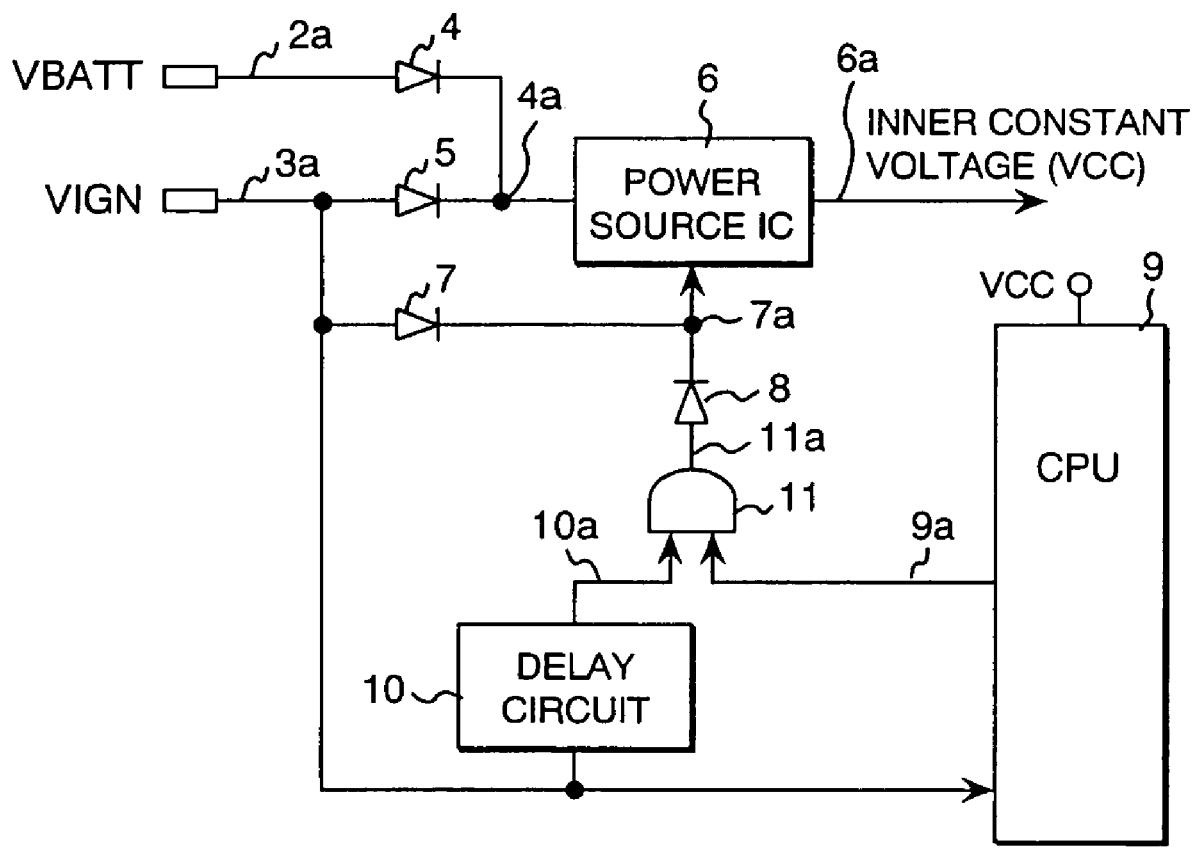
FIG. 3 is a drawing showing the constitution of another embodiment of the electronic control unit for car of the present invention.
Figure 4:
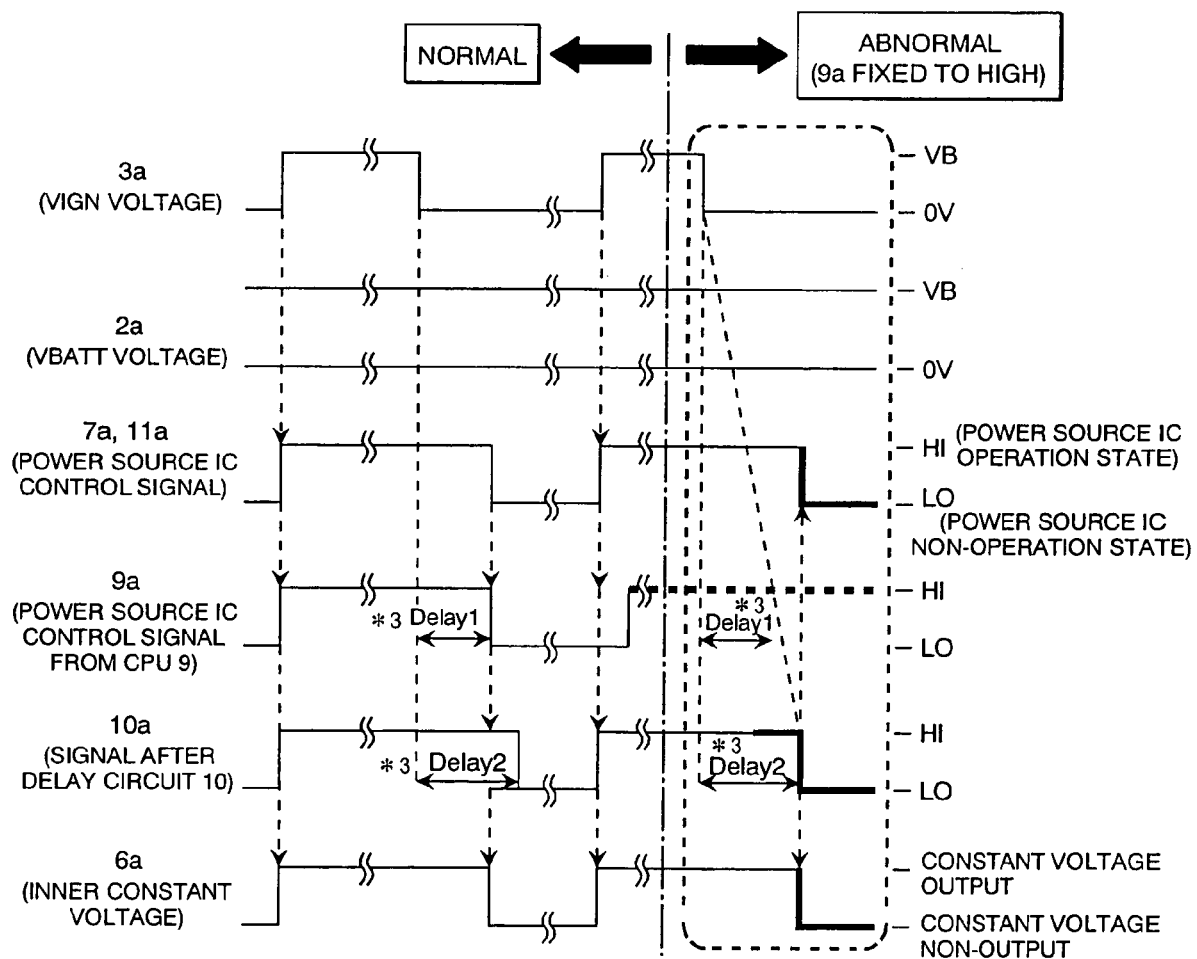
FIG. 4 is a drawing showing the operation timing of the embodiment shown in FIG. 3 of the electronic control unit for car of the present invention.

FIGS. 3 and 4 show the second embodiment for improving the above problems. FIG. 3 is a block diagram of the electronic control unit for car and FIG. 4 shows a timing chart thereof. The signal 7a controlling the power source IC is controlled by the output signal 11a of the AND circuit 11 inputting the output signal 10a of the delay circuit 10 and the control signal 9a from the CPU 9. The signal, when the AND is not realized, becomes an interruption signal of the power source IC 6, that is, a non-operation state signal.

FIG. 4 is a timing chart of FIG. 3 having the aforementioned constitution. When the ignition switch SW3 is turned off and the VIGN voltage 3a is changed from a high signal to a low signal, the CPU 9 detects it and after a lapse of the predetermined time of Delay 1 (the time required for initialization), changes the control signal 9a from high to low. On the other hand, the delay time of the delay circuit 10 is set at a delay time longer than the time (the time of Delay 1) outputted by the CPU 9. Therefore, the output signal 10a retains a high signal for a longer time than that of the signal 9a from the CPU 9, so that the control signal 9a from the CPU 9 can control the output signal 11a of the AND circuit 11. If the signal 9a is changed from high to low, the signal 11a can be controlled.

And, in this circuit constitution, the line of the control signal 9a from the CPU 9 is assumed to be fixed to the high signal level due to an unexpected situation. When the supply voltage VIGN is turned off, the VIGN signal 3a is changed from high to low. At that time, the signal 3a is changed from high to low after a lapse of the time of Delay 2 preset by the delay circuit 10. Simultaneously with it, the signal 11a of the AND circuit 11 is also changed from high to low, thus the power source IC 6 can be put into the non-operation state, so that the supply of the inner constant voltage (VCC) 6a can be interrupted. Even if the CPU 9 enters the abnormal state like this, the supply of the inner constant voltage (VCC) can be stopped surely.

In FIG. 4, the left half of the time chart indicates a normal case and the right half enclosed by a dotted line indicates an abnormal case. In the right half of the time chart, even if the control signal 9a for the power source IC from the CPU 9 is fixed to the high level as indicated by a dotted line, the signal 10a from the external delay circuit 10 is changed from high to low, thus the power source IC 6 can be put into the standby state. By doing this, even if an abnormal state is generated that the control signal 9a from the CPU 9 is fixed to the high level, the power source IC 6 can be put into the non-output state.

Figure 5:
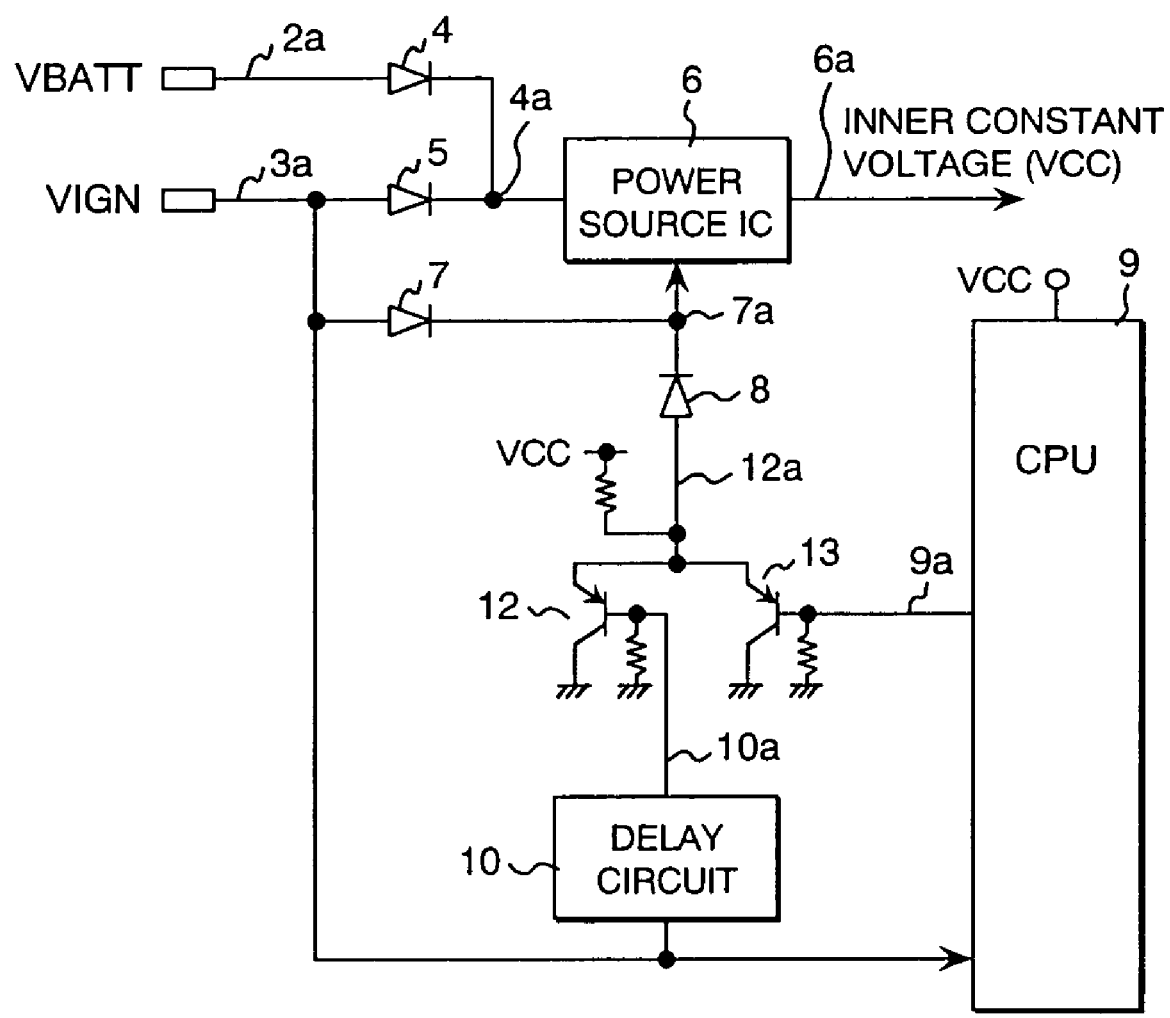
FIG. 5 is a drawing showing the constitution of still another embodiment of the electronic control unit for car of the present invention.
Figure 6:
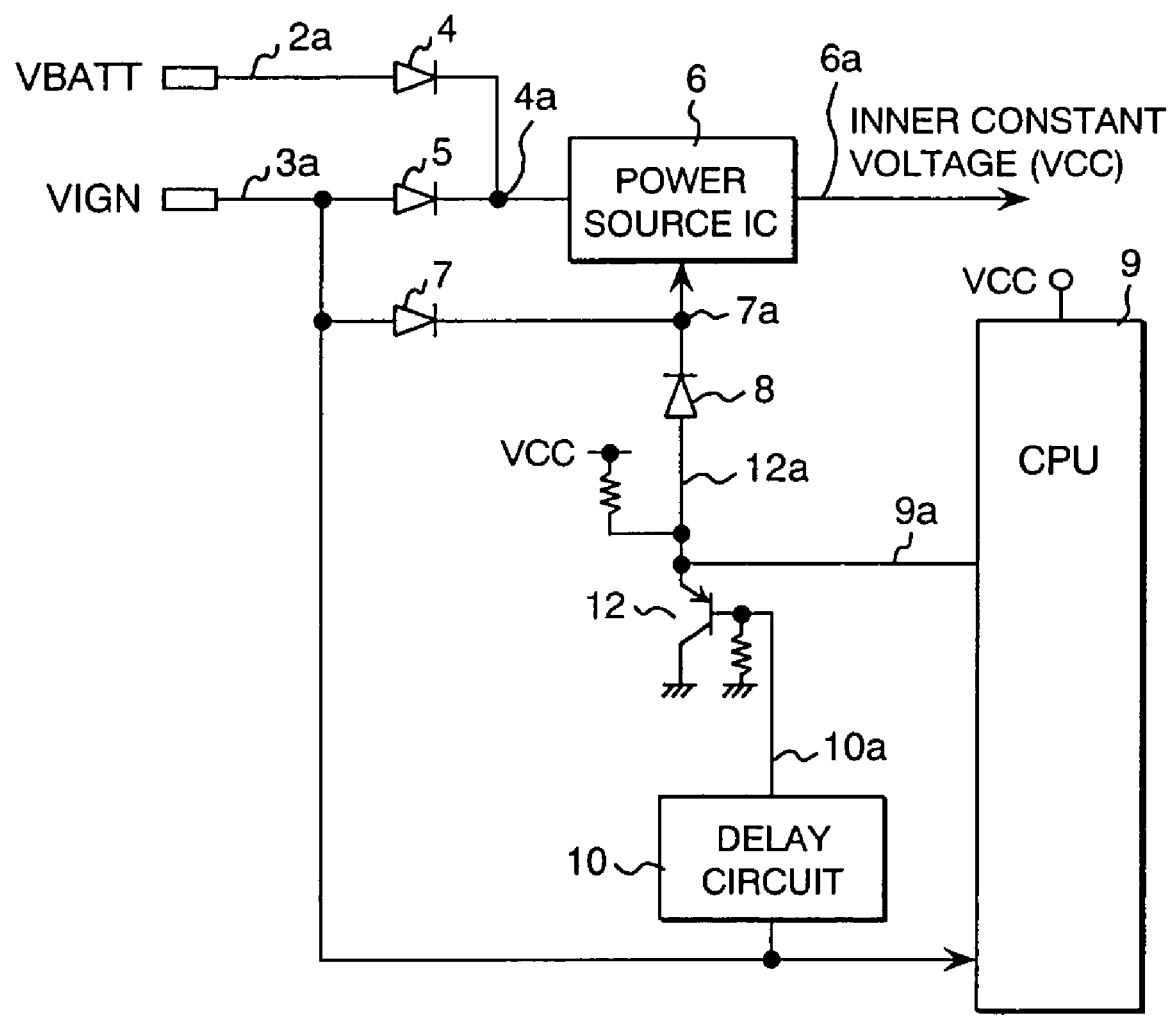
FIG. 6 is a drawing showing the constitution of a further embodiment of the electronic control unit for car of the present invention.
Figure 7:
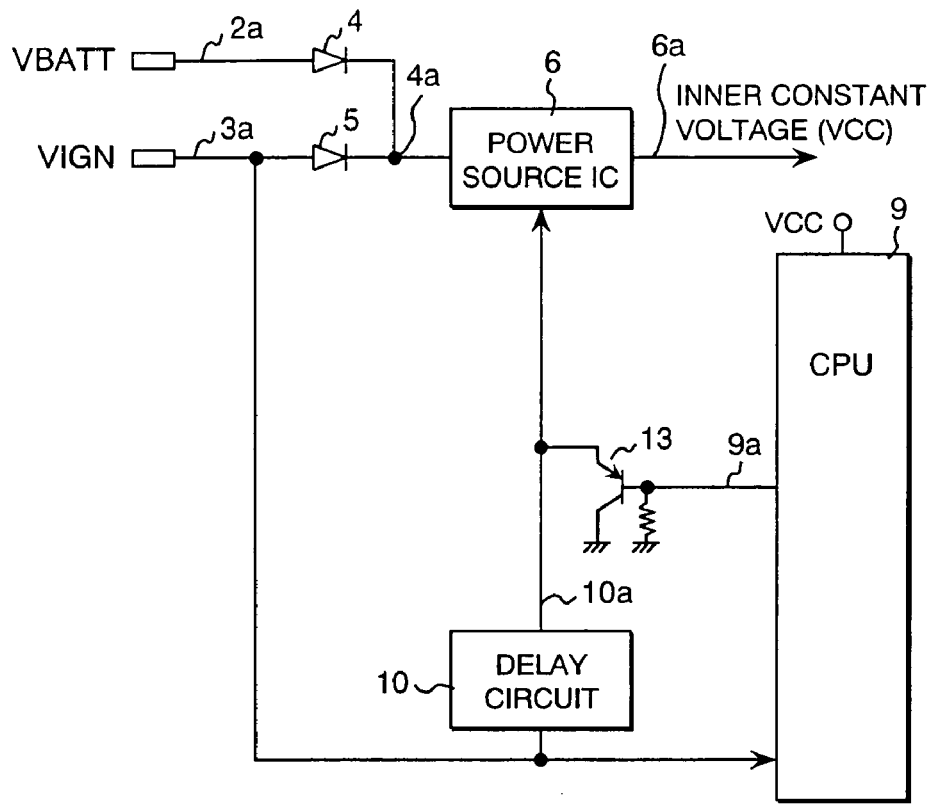
FIG. 7 is a drawing showing the constitution of a still further embodiment of the electronic control unit for car of the present invention.

FIGS. 5, 6, and 7 respectively show the constitutions of other embodiments for solving the aforementioned problems. FIG. 5 shows the AND circuit 11a in FIG. 3 consisting of two switching elements (transistor constitution). When the VIGN voltage 3a is changed from a low signal to a high signal, the output signal 10a of the delay circuit 10 is high and a transistor 12 is off. Further, at this time, the control signal 9a from the CPU 9 also outputs a high signal and a transistor 13 is also off. Therefore, a signal 12a composed by the transistors 12 and 13 goes high, and the subsequent control signal 7a of the power source IC 6 via the diode 8 also goes high, and the power source IC 6 is continuously kept in the operation state.

And, when the VIGN voltage 3a is changed from a high signal to a low signal, the CPU 9 detects it and after a lapse of a predetermined Delay time, the control signal 9a from the CPU 9 is changed from high to low. At this time, the transistor 13 is turned on, thus the control signal 7a of the power source IC 6 goes low, and the power source IC 6 enters the non-operation state. However, also in this circuit constitution, the line of the control signal 9a from the CPU 9 is assumed to be fixed to the high signal level due to an unexpected situation. Also in this case, when the VIGN signal 3a is changed from high to low, after a lapse of the Delay time preset by the delay circuit 10, the signal 10a is changed from high to low, and the transistor 12 is turned on, and the composite signal 12a is changed from high to low. As a result, the power source IC 6 can be put into the non-operation state, so that the supply of the inner constant voltage (VCC) 6a can be interrupted.

FIGS. 6 and 7 respectively show a case that the signal 7a controlling the power source IC 6 or either of the signal 10a of the relay circuit 10 and the control signal 9a from the CPU 9 is executed using one switching element (transistor constitution). FIG. 6 shows a case that only on the side of the output signal 10a of the delay circuit 10, the switching transistor 12 is installed and by the output signal 10a of the delay circuit 10, the transistor 12 can be operated. In this case, when the line of the control signal 9a from the CPU 9 is fixed to a high level signal due to an unexpected situation, after a lapse of the Delay time preset by the delay circuit 10, the signal 10a is changed from high to low, and the transistor 12 is turned on, and the composite signal 12a is changed from high to low, thus the power source IC 6 can be put into the non-operation state, so that the supply of the inner constant voltage (VCC) 6a can be interrupted.

FIG. 7 shows a case that only on the side of the control signal 9a from the CPU 9, only the switching transistor 13 is installed and by the control signal 9a from the CPU 9, the transistor 13 can be operated. In this case, when the line of the control signal 9a from the CPU 9 is fixed to a high level signal due to an unexpected situation and after a lapse of the Delay time preset by the delay circuit 10, the signal 10a is changed from high to low, the power source IC 6 can be directly put into the non-operation state and the supply of the inner constant voltage (VCC) 6a can be interrupted. Further, in this circuit constitution, the diode 7 or 8 shown in FIG. 5 can be omitted, thus the circuit can be simplified.

Figure 8:
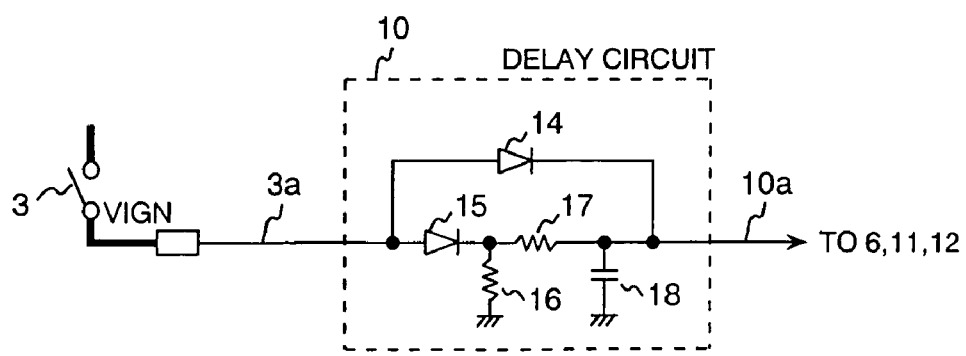
FIG. 8 is a block diagram showing a concrete example of a delay circuit in the electronic control unit for car of the present invention.
Figure 9:
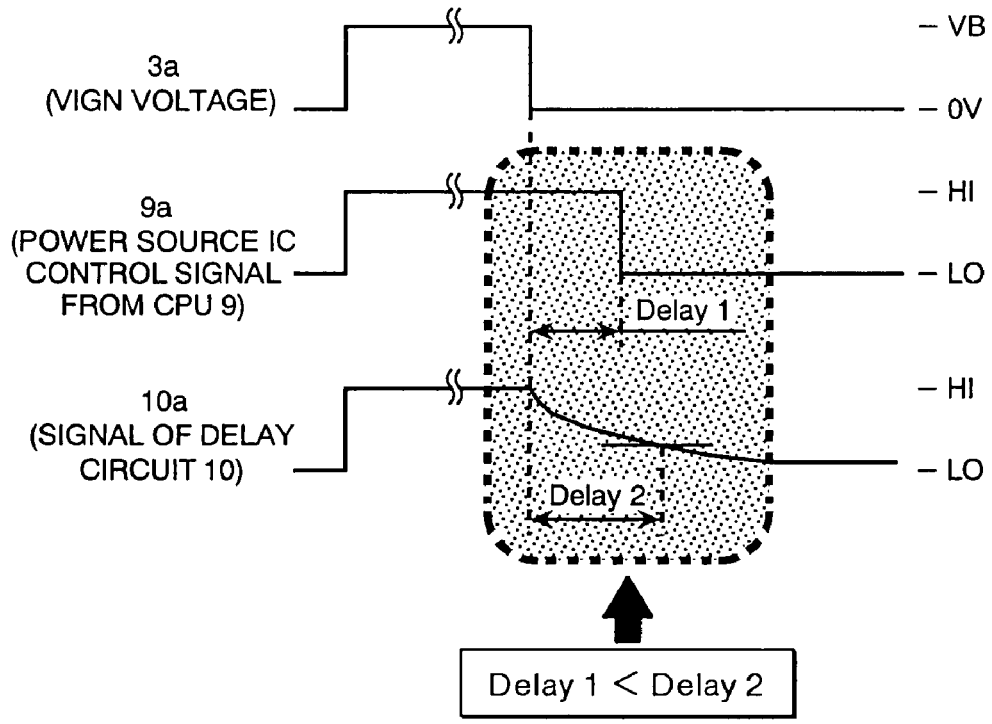
FIG. 9 is a drawing showing the operation timing concerning the delay circuit in the electronic control unit for car of the present invention.
Figure 10:
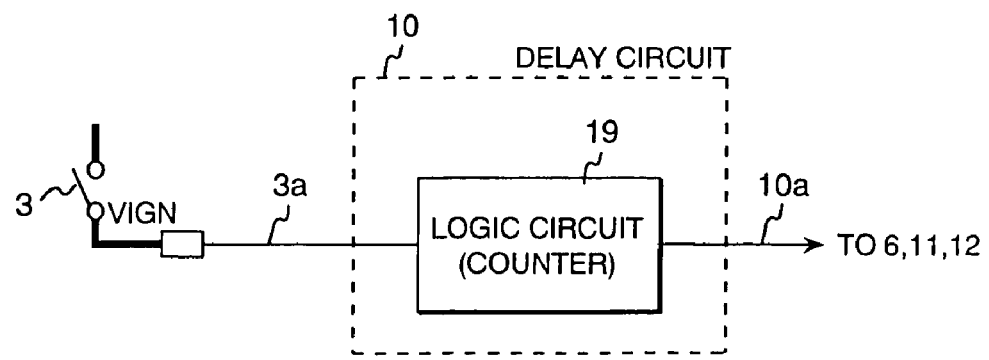
FIG. 10 is a schematic block diagram showing an example of a delay circuit constituted by a counter in the electronic control unit for car of the present invention.

FIGS. 8, 9, and 10 respectively show block diagrams and a timing chart of the delay circuit of the electronic control unit for car for improving the aforementioned problems. FIG. 8 shows a delay circuit constituted by passive elements. The delay circuit 10 is composed of diodes 14 and 15, resistors 16 and 17, and a capacitor 18 and the diode 14, when the VIGN voltage 3a is changed from a low signal to a high signal, is used to immediately transfer the change to the signal 10a of the delay circuit 10 on the output side. The diode 15 is used to prevent the charge collected in the capacitor 18 from discharging to other circuits on the same circuit.

FIG. 9 is a timing chart of the delay circuit and when the VIGN voltage 3a is changed from a low signal to a high signal, it shows immediately that the output signal 10a of the delay circuit 10 is changed from low to high. On the other hand, when the VIGN voltage 3a is changed from a high signal to a low signal, FIG. 9 shows that the charge collected in the capacitor 18 is discharged for the time of Delay 2 preset by the delay circuit 10 and the necessary time therefor is ensured. At this time, the time Delay 2 must be set longer than the time Delay 1 of the control signal 9a from the CPU 9. FIG. 10 shows a case that the delay circuit is constituted by a logic circuit (a counter, etc.) 19.

Figure 11:
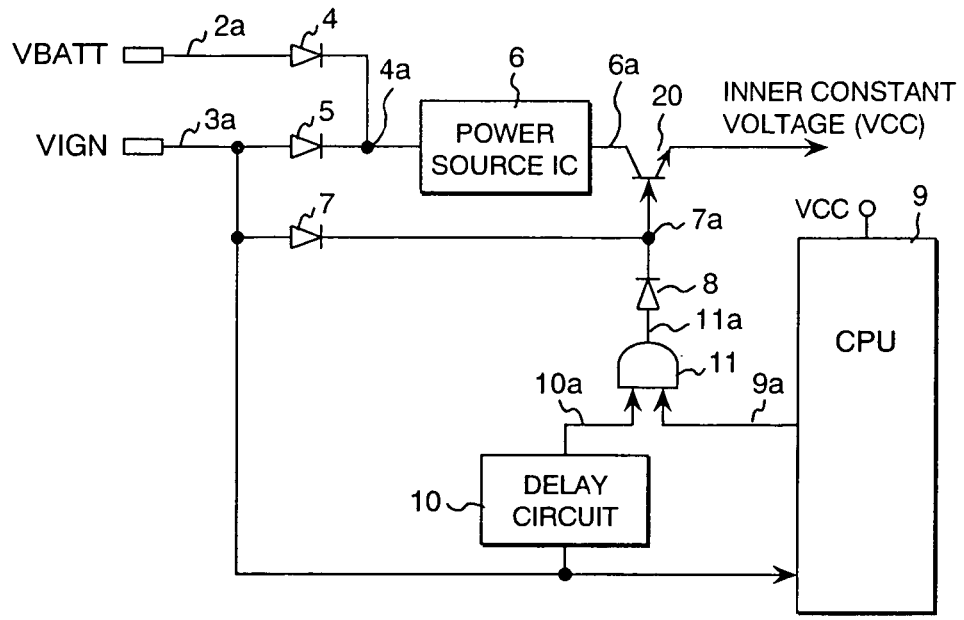
FIG. 11 is a block diagram showing another embodiment of the electronic control unit for car of the present invention.

FIG. 11 shows another embodiment of the present invention. To supply or interrupt the inner constant voltage (VCC) 6a from the electronic control unit for car 1, there is an available method using a transistor for ON and OFF control on the supply voltage line (the line for supplying the supply voltage (VIGN) from the battery) or the constant voltage line (the line for supplying the constant voltage (VCC) from the power source IC to the internal circuit). In FIG. 11, a transistor 20 is installed on the constant voltage line side. In this case, the transistor 20 is controlled by the control signal 7a (the control by the control signal 7a is described in FIGS. 3 and 4).

In this case, when the control signal 7a is a high level signal, the transistor 20 is in the ON state and supplies the inner constant voltage (VCC) 6a into the electronic control unit for car 1. Further, when the control signal 7a is low, the transistor 20 is in the OFF state and interrupts the supply of the inner constant voltage (VCC) 6a.

Figure 12:
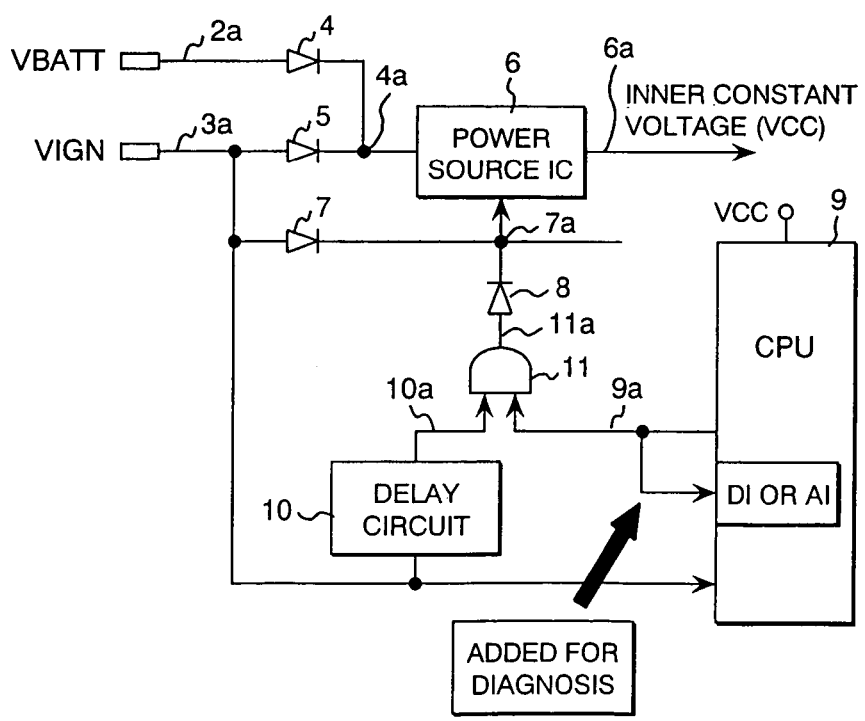
FIG. 12 is a block diagram showing still another embodiment of the electronic control unit for car of the present invention.

FIG. 12 shows still another embodiment of the present invention. In this constitution, the control signal 9a from the CPU 9 is input to a patterned digital.input port (DI) or analog input port (AI) of the CPU 9, thus the state of supply or interruption of the inner constant voltage (VCC) 6a from the electronic control unit for car 1 can be monitored. The reason is that the CPU 9 can make a self diagnosis of the state thereof by a diagnostic function. The diagnostic function can diagnose whether the signal 9a is changed from high to low or is kept high. As a result, by an alarm indication, the state can be confirmed. And, the CPU 9 makes a diagnosis and simultaneously can put the power source IC into the non-operation state by an output signal of the delay circuit.

Figure 13:
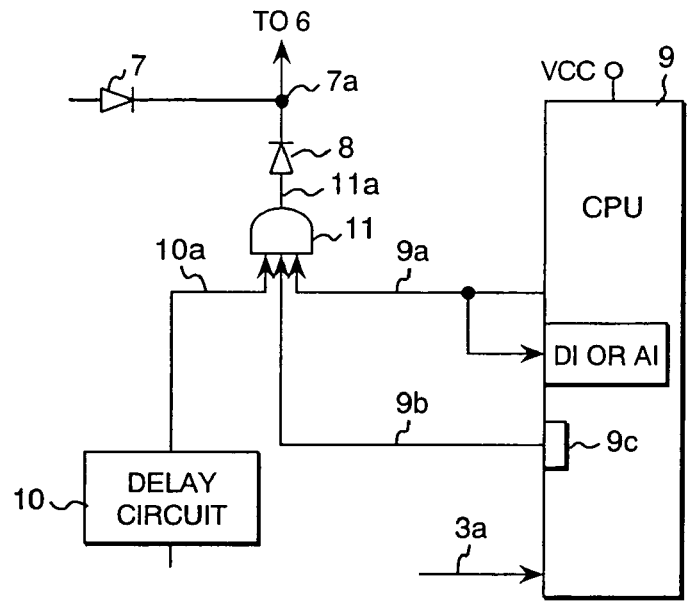
FIG. 13 is a block diagram showing a further embodiment of the electronic control unit for car of the present invention.
Figure 14:
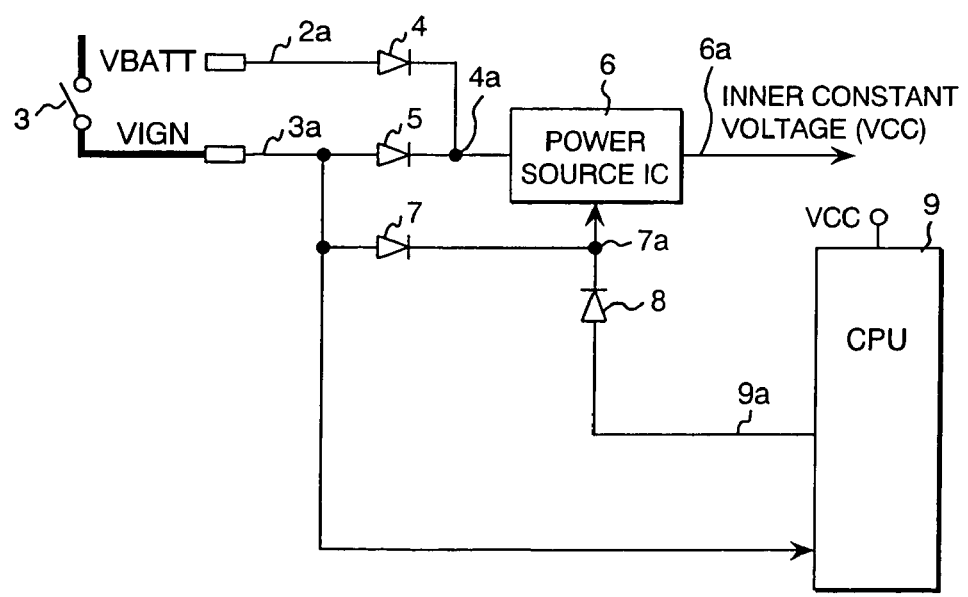
FIG. 14 is a drawing showing the constitution of a conventional electronic control unit for car.
Figure 15:
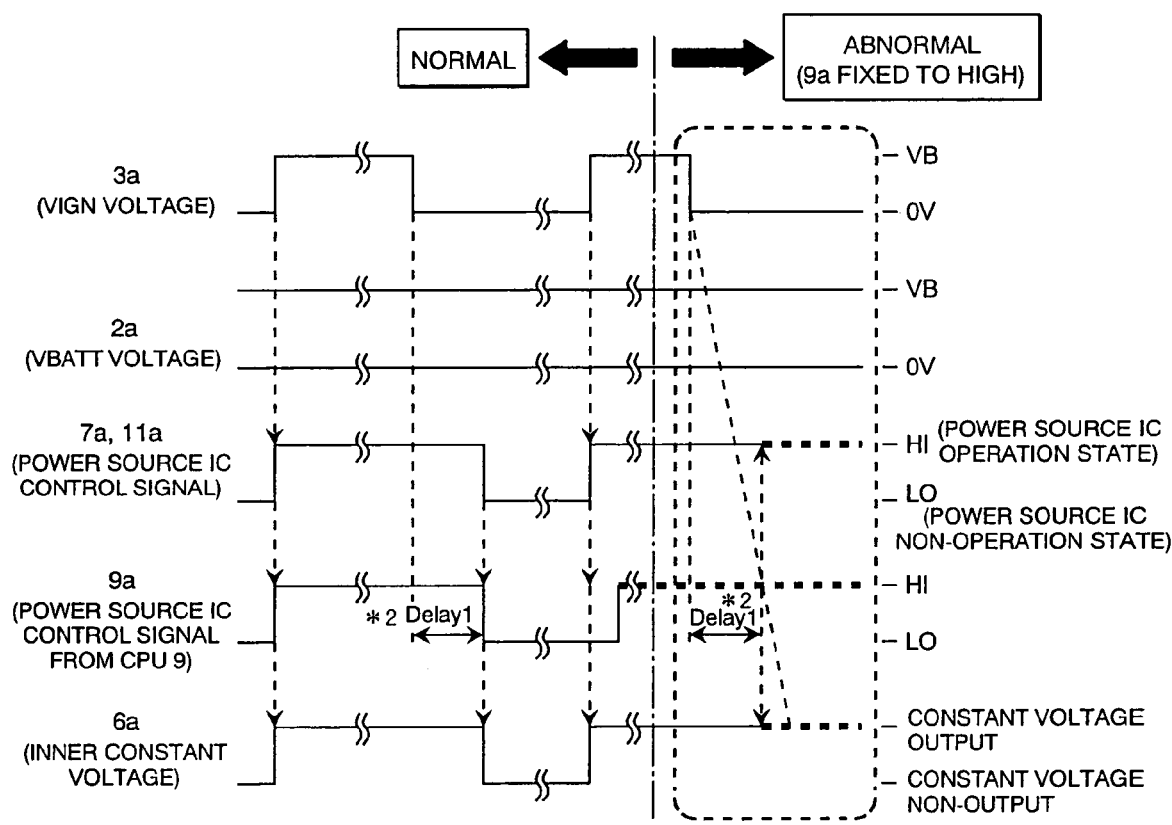
FIG. 15 is a drawing showing the operation timing of a conventional electronic control unit for car.

Further, FIG. 13 shows an. embodiment when a state signal 9b of another port of the CPU 9 is used as an input signal of the AND circuit 11. In this example, the input signal of the AND circuit is composed of three signals of 10a, 9b, and 9a and when one of them is changed from high to low, the power source IC can be controlled in the non-operation state. The state signal 9b of the port 9c may be a signal of diagnostic results or other state signals. It is advisable that a state signal is changed from high to low when the VIGN voltage is turned off.

Further, in this example, three signals are ANDed, though the present invention is not limited to three signals. A signal effective in ON and OFF control of the power source IC 6, even if ANDed with other signals, can produce the same effect.

According to the present invention, when the line of the control signal from the central processing unit (CPU) is continuously kept as an HI signal (for permitting the power source IC to operate) due to an unexpected situation, the power source IC cannot move into the non-operation state and the ordinary supply of the constant voltage (VCC) into the electronic control unit for car in correspondence therewith can be prevented. Accordingly, the battery of a car can be prevented from consumption and bad effects on the car can be avoided.

(Effects of the Invention)

According to the electronic control unit of the present invention, even if the line of the control signal from the central processing unit (CPU) enters an abnormal state due to an unexpected situation, the power source IC can be moved into the non-operation state, so that the battery can be prevented from consumption.

What is claimed is:

1. A car electronic control unit, comprising:
a battery;
a power source to which power is suppliable from the battery;
a central processing unit to which a constant voltage (VCC) is suppliable from the power source;
an ignition switch operatively coupled between the battery and the power source to control a supply or interruption of a constant voltage that the power source is configured to generate by ON/OFF control thereof;
a delay circuit for delaying an OFF signal by a predetermined delay time when the ignition switch is turned off; and
an AND circuit arranged to have voltage of the battery directly transmitted thereto via a first diode with the ignition switch turned on so that an output signal of the delay circuit immediately changes from low to high and to input a control signal outputted from the central processing unit and an output signal of the delay circuit;
wherein the central processing unit is configured to detect that the power supplied from the battery is interrupted when the ignition switch is turned off, and to change the control signal after lapse of a predetermined time amount after the ignition switch is turned off for interrupting the supply of the constant voltage, the delay time of the delay circuit is set at longer than the predetermined time amount, and the delay circuit further includes first a resistor, a second resistor, a capacitor, and a second diode, with the capacitor being arranged to be directly charged via the second diode and the first resistor with the ignition switch turned on from the battery and to be discharged via the first and second resistors with the ignition switch turned off to change the output signal of the control circuit from high to low after the delay time.

2. An electronic control unit for car according to claim 1, wherein the central processing unit is configured to monitor a state of supply or interruption of the constant voltage by inputting the control signal to a digital input port or an analog input port of the central processing unit.

* * * * *